United States Patent [19]

Sasaki

[11] 4,305,827

[45] Dec. 15, 1981

[54] HEAVY METAL ADSORBENTS OF HIGH SELECTIVITY, PROCESS FOR PRODUCTION OF SAME, AND ADSORPTION PROCESS

[75] Inventor: Akio Sasaki, Jyoyo, Japan

[73] Assignee: Unitika Ltd., Hyogo, Japan

[21] Appl. No.: 154,740

[22] Filed: May 30, 1980

[30] Foreign Application Priority Data

May 30, 1979 [JP] Japan .................................. 54-67985

[51] Int. Cl.$^3$ ............................................ B01D 15/08
[52] U.S. Cl. ..................................... 210/688; 210/694; 252/428
[58] Field of Search ..................... 55/74; 210/679, 688, 210/694, 912–914; 252/428

[56] References Cited

U.S. PATENT DOCUMENTS

| | | | |
|---|---|---|---|
| 1,922,416 | 8/1933 | Block ........................................ | 55/74 |
| 3,755,161 | 8/1973 | Yokota et al. ........................ | 210/679 |
| 3,873,581 | 3/1975 | Fitzpatrick et al. ................ | 210/688 |
| 4,039,446 | 8/1977 | Ban et al. ............................. | 210/688 |
| 4,070,282 | 1/1978 | Otto ...................................... | 210/694 |

*Primary Examiner*—Ivars C. Cintins
*Attorney, Agent, or Firm*—Sughrue, Mion, Zinn, Macpeak and Seas

[57] ABSTRACT

A heavy metal adsorbent of high selectivity, a process for the production thereof, and an adsorption process using the heavy metal adsorbent are described; the adsorbent exhibits high adsorptivity particularly for mercury, and has excellent chemical stability, e.g., heat resistance and alkali resistance, and dimensional stability. This adsorbent is applicable, e.g., to the removal of mercury from waste water resulting from the washing of smoke in huge incineration stations, from saturated brine used in the sodium industry in an ion exchange membrane method, and so forth.

23 Claims, No Drawings

HEAVY METAL ADSORBENTS OF HIGH SELECTIVITY, PROCESS FOR PRODUCTION OF SAME, AND ADSORPTION PROCESS

BACKGROUND OF THE INVENTION

1. Field of the Invention

This invention relates to a novel adsorbent for heavy metals which is obtained by treating active carbon with water-soluble amine and carbon disulfide, a process for production of the novel adsorbent, and an adsorption process using the novel adsorbent.

2. Description of the Prior Art

In recent times pollution caused by heavy metals contained in industrial waste water has become a significant problem, and chelate ion exchange resins have been highly valued as being effective for the adsorption removal of heavy metals from waste water. In particular, chelate ion exchange resins having chelate functional groups such as iminodiacetic acid and thiourea, with a phenol-aldehyde resin or a styrene resin as a base, have been put to practical use.

Such ion exchange resins, however, are insufficiently satisfactory in their adsorption capacity life (particularly for mercury ions) and production costs, and further improvements have been desired.

Japanese Patent Publication No. 22554/1978 discloses an adsorbent for use in removal of very small amounts of heavy metals, particularly mercury in gases, which is produced by depositing semicarbazide or its derivatives on active carbon; Japanese Patent Publication No. 8474/1979 discloses an adsorbent which is produced by depositing a sulfur-containing amino compound, such as thiourea, thiosemicarbazide, or thioacetamide, and sulfur-containing amino acid together with a hydrohalogenic acid on active carbon; and in Japanese Patent Publication No. 38597/1979, heavy metal-capturing materials are described which are produced by depositing barium sulfate, iron sulfide, zinc sulfide, manganese sulfide and dithiocarbamic acid derivatives on active carbon.

These adsorbents, however, are disadvantageous in that when they are used for removal of heavy metals in aqueous solutions, thiosemicarbazides, dithiocarbamic acid derivatives, and metal salts are partially dissolved since they are relatively soluble in water and separate from the active carbon. Moreover, they cannot be used at all for removal of mercury in concentrated sulfuric acid, nor can they be used for removal of mercury in saturated brine used in the sodium industry in an ion exchange membrane process. Furthermore, when they are charged in to a column, for example, for the disposal of waste water resulting from the washing of smoke in refuse incineration stations, the contact surface between adsorbent and water, adsorption capacity, mechanical strength and so on must be taken into consideration.

Thus a continuing need exists for adsorbents which are economical and of practical value.

SUMMARY OF THE INVENTION

An object of this invention is to provide a heavy metal adsorbent which has high adsorptivity, particularly for mercury, is excellent in chemical stability, having, for example, heat resistance, acid resistance, alkali resistance and oxidation resistance, and which shows only a minimal loss of adsorptivity after being washed with a large amount of water, and a process for economically producing the heavy metal adsorbent.

Another object of this invention is to provide a process for the adsorption and removal of heavy metals by contacting a solution containing the heavy metals with the adsorbent of the invention.

As a result of extensive and elaborate investigations to achieve the above objects, it has now been found that by treating active carbon with water-soluble amine and carbon disulfide, desirable heavy metal adsorbents are obtained. These adsorbents show minimal loss of adsorptivity when washed with a large amount of water; can be obtained by a simple and economical procedure, exhibit high selectivity for adsorbing heavy metals (particularly mercury), have an excellent adsorption capacity, and retain their adsorptivity for a long period of time.

This invention, therefore, provides a heavy metal adsorbent of high selectivity which is produced by treating active carbon with water-soluble amine and carbon disulfide, a process for the production of these heavy metal adsorbents of high selectivity wherein active carbon is treated with water-soluble amine and carbon disulfide in the presence of water, and an adsorption process for a heavy metal-containing solution which is characterized in that the heavy metal-containing solution is contacted with the heavy metal adsorbent.

According to this invention, then, heavy metal adsorbents, the adsorptivity of which shows only a minimal decrease after being washed with a large amount of water, can be obtained by a simple and economical procedure, and the adsorbents so obtained have high selectivity and adsorption capacity for heavy metals such as mercury, silver, gold, copper, and cadmium, particularly mercury and silver, and they have excellent duration of life.

DETAILED DESCRIPTION OF THE INVENTION

By treating active carbon with water-soluble amine and carbon disulfide in the presence of water according to this invention, adsorbents showing little elution into water can be obtained: that is, the adsorption capacity shows only a minimal decrease after water processing (i.e., after being washed with a large amount of water).

As is known in the art, dithiocarbamic acid salts (RR'NCSSH.NHRR') are obtained by reacting carbon disulfide ($CS_2$) and amines (2RR'NH) in an alcohol or water/alcohol mixture as a solvent, and dithiocarbamic acid derivatives (RR'NCSNRR') are obtained on heating the dithiocarbamic acid salts (R is $NH_2$ or an alkyl group having 1 to 20 carbon atoms and R' is hydrogen or an alkyl group having 1 to 20 carbon atoms. However, when R and/or R' is an alkyl group, the total carbon atoms of R and R' are 1 to 20.).

Although the reaction of this invention is heterogeneous (since it is carried out in a water system, and carbon disulfide is insoluble in an aqueous amine solution), both the amine and carbon disulfide wet the active carbon and the reaction proceeds smoothly without phase-separation. In the reaction of this invention, therefore, it is believed that RR'NCSSH.NHRR' is formed at the first stage and RR'NCSNRR', at the second stage, as in the known reaction sequence. However, if the adsorbent is prepared by first producing RR'NCSSH.NHRR' or RR'NCSNRR' through the reaction of the water-soluble amine (2RR'NH) and the carbon disulfide (CS$_2$), and then depositing the reaction product on active carbon, the adsorption capacity of the adsorbent is reduced when subjected to water processing. This is a significant and surprising distinction between these adsorbents and the adsorbent of this invention.

Although the reasons for this are not clear, it is believed that since carbon disulfide is insoluble in water and comes into contact with amine only on the surface of active carbon on which it is adsorbed, the reaction occurs mainly on the surface of active carbon, and this results in the occurence of distinctions in the adsorption site and distribution of active carbon or adsorption component between them.

In the production of the adsorbent of this invention, it is necessary to treat active carbon with water-soluble amine and carbon disulfide in the presence of water, but the addition order of the active carbon, water-soluble amine and carbon disulfide is not critical.

In some cases, however, care must be taken so that the water-soluble amine and carbon disulfide do not come in contact with each other in the aqueous phase at more than 40° C. while being insufficiently adsorbed on the surface of active carbon, or reaction occurs to precipitate the products in the aqueous phase. Rather, compounds such as polyfunctional amines such as polyethyleneimine producing reaction products, are produced under such conditions. Such compounds are only sparing in soluble in water, immediately precipitate, and are difficultly adsorbed on active carbon. Therefore, before raising the temperature, sufficient time should be provided for permeation of both the amine and the carbon disulfide into the interior of the active carbon and deposition thereon, preferably at 40° C. or less, and more preferably at from 10° C. to 40° C.

This time is experimentally be determined, since it varies depending upon the kind and grain size of active carbon, the kind and molecular weight of water-soluble amine, and the amount of each component introduced. Usually it is from 10 minutes to 5 hours, and preferably is from 30 minutes to 2 hours. For example, in the case of polyvalent amines such as aromatic amines and polyethyleneimine, it is preferred that first the amines are adsorbed on active carbon, and, after removing unadsorbed amine, the adsorbed amine is reacted with carbon disulfide. This prevents the formation of minute reaction products and the occurrence of blockages when continuously passing a heavy metal solution therethrough.

The term "treatment" as herein used refers to the state in which water-soluble amine and carbon disulfide are reacted on active carbon in the presence of water, and also to the state in which these components are adsorbed on active carbon. The order of the reaction and adsorption is not critical, and they may occur at the same time.

The reaction temperature employed in this invention should be from about 40° C. to 100° C., preferably is from 40° C. to 95° C., and more preferably is from 65° C. to 90° C. At lower temperatures, mainly the first stage reaction occurs, and at higher temperatures, mainly the second stage reaction occurs. Reaction products obtained by the first stage reaction are usually soluble in water, and after being adsorbed on active carbon, often may be undesirably stripped with ease from the active carbon. For the final products, therefore, it is preferred to allow the reaction to proceed until the second stage reaction occurs.

For this purpose, the ratio of primary or secondary amino group in water-soluble amine to carbon disulfide (its equivalency is two) is important, and a ratio range of the former to the latter of from about 1:0.2 to 1:1.1 (equivalent) is usually employed. Within this ratio range, a ratio range of from 1:0.2 to 1:0.5 is desired, since the reaction thereby proceeds smoothly to the second stage reaction, and relatively insoluble products can be obtained.

On the other hand, using a ratio range of 1:0.5 to 1:1.1, the reaction generally stops at the first stage reaction, and relatively soluble products are obtained. In this case, it is desired that there is present tertiary amine in a sufficient amount for carbamic acid to form a salt. However, it is not preferred to separately add another tertiary amine compound. For example, polyethyleneimine generally has the highly branched structure in which the ratio of primary amine to secondary amine to tertiary amine is from about 1:1 to 1:2:1, and this tertiary amine contributes to the formation of salt.

Although the reaction products obtained by the first stage reaction are usually relatively soluble, those produced from high polymer amines, such as polyethyleneimine, by the first stage reaction are relatively in soluble. Furthermore, even the relatively soluble products, when once adsorbed on active carbon, exhibit relatively in soluble properties. Therefore, the use of 0.5 to 1.1 equivalents of carbon disulfide can be effective for increasing the adsorption capacity of heavy metals. The amount is determined depending upon the starting material and purpose, and the products generally become relatively in soluble through the formation of complexes with heavy metal ions. Thus, the use of 0.5 equivalent or more of carbon disulfide is not necessarily disadvantageous.

The time required for the treatment of this invention varies depending upon the temperature employed. From observation of the phenomenon that active carbon containing carbon disulfide initially floats in the upper portion of the reaction solution, and then uniformly disperses in a short period of time, it appears that the first stage reaction proceeds rather quickly. Then, on raising the temperature to 50° C. or more, hydrogen sulfide is gradually produced and the total reaction is completed in several hours. In order to attain complete adsorption of the components onto the active carbon, the active carbon may be allowed to stand in the solution at room temperature for additional several hours. It is then filtered and washed with water to remove excessive amine, alkali and the like. Thus an adsorbent of this invention can be produced by such a simple procedure.

Any active carbon can be used in this invention. In particular, coconut shell carbon activated at about 500° to 800° C. is suitable because of its high heavy metal adsorptivity. This is considered due to the fact that the iron content of coconut shell carbon is small in comparison with that of coal carbon, and a low temperature activated carbon having many acid groups exhibit a high adsorption ratio for heavy metals. The grain size of active carbon is an important factor controlling the liquid passage rate. It is from about 10 to 100 mesh, and preferably is from 20 to 60 mesh.

Water-soluble amines as herein used are those containing at least one primary or secondary group in the molecule and having a solubility of at least 1 wt% in water. Examples of such water-soluble amines are diamines such as hydrazine (hydrate), ethylenediamine, propylenediamine, butylenediamine, m-phenylenediamine, mixed m,p (m:p=90:10 to 10:90)-xylenediamine and piperazine, monoamide such as propylamine, butylamine, aniline and benzylamine, diethylenetriamine, triethylenetetramine, tetraethylenepenamine, etc., and their homologous compounds such as polyethyleneimine. Of these amines, those having as many reaction sites as possible, that is, divalent or polyvalent amines, are preferred, from the point of view of the difficulty with which the reaction product can be stripped from the active carbon.

In particular, hydrazine, mixed m,p-xylenediamine, and polyethyleneimine exhibit excellent adsorptivity. This is based on consideration of factors such as the introduction ratio of metal ligand per unit weight, the adsorptivity of the reaction products with carbon disulfide onto active carbon and the difficulty with which they are stripped by water.

The molecular weight of polyethyleneimine is desirably high so that it can not be stripped with ease. Those having molecular weights of 103 (in this case diethylenetriamine) to 70,000 and also those having molecular weights of up to about 100,000 (400 to 900 cps) can be used. However, when the molecular weight is extremely high, it becomes difficult for polyethyleneimine to enter into pores of the interior of active carbon, leading to reduced amounts of polyethyleneimine deposited thereon, and the desired adsorption capacity sometimes cannot be obtained. On the other hand, those having low molecular weights easily strip from active carbon. Taking into account these points, the molecular weight of polyethyleneimine is preferably 500 to 20,000 and particularly preferably 1,000 to 10,000. These polyethyleneimines are available as aqueous solutions and they can be used after being diluted to desired levels.

The thus obtained adsorbent exhibits high selective adsorptivity for heavy metals, particularly for mercury, and in the same manner as for conventional chelate ion exchange resins, it can be brought in contact with a mercury-containing solution to remove the mercury.

For bringing the adsorbent of this invention in contact with the mercury-containing solution, a batch method can be employed in which the adsorbent is merely mixed with the solution and shaken, or a column method can be employed in which the adsorbent is charged in to a column and the solution is passed through the column. In general, the column method is employed. The temperature of the heavy metal-containing solution is suitably from about 45° C. to 100° C. and the contact time is suitably from about 4 hours to 8 hours.

The adsorption method of this invention is useful for the removal of mercury from waste water used for the washing of smoke in refuse incineration stations, concentrated sulfuric acid, saturated brine used in the sodium industry in an ion exchange membrane process, and so forth. Furthermore, organic mercury compounds, such as thimerosal and mercurochrome used for treating cuts, can also be efficiently removed from waste water according to the adsorption method of this invention.

According to this invention, their heavy metal adsorbents, having an absorptivity of which hardly decreases after the water processing: that is, after being washed with a large amount of water, can be obtained by a simplified and economical method, and the adsorbent so obtained has high selectivity and adsorption capacity for heavy metals such as mercury, silver, gold, copper and cadmium, particularly for mercury and silver, and its duration of life is excellent. In addition, the adsorption method of this invention permits efficient removal of heavy metals, particularly mercury.

The following examples and comparative examples are given to illustrate this invention in greater detail.

EXAMPLE 1

Coconut shell active carbon (30 to 60 mesh, produced by Daiichi Tanso Kogyo Co.) in an amount of 9.00 g was gently stirred in 200 ml of ion exchange water containing 0.95 g (0.0125 mole) of carbon disulfide, and 10 ml of ion exchange water with 2.03 g (0.0325 mole) of hydrazine hydrate (80%) dissolved therein was added thereto at one time. The active carbon containing carbon disulfide and floating in a massive form was gradually uniformly dispersed. After one hour, the temperature of the solution was raised from ordinary temperature to 40° C. and the reaction was effected at that temperature for 1 hour, subsequently at 70° C. for 1 hour, and finally at 95° C. for 2 hours. The heating was stopped and the solution was allowed to stand as it is for 10 hours. Thereafter, the solution was washed ten times, each two with 100 ml of ion exchange water. After the time of washing numbers 5, 6, 7, 8 and 10, small amounts of samples were taken out, and they were dried under reduced pressure at 80° C. for 12 hours to obtain adsorbents.

The total weight of the dried active carbon was 10.298 g and the increase in weight was 14.4%.

COMPARATIVE EXAMPLE 1

Thiocarbohydrazide (corresponding to the reaction product of hydrazine used in Example 1 and carbon disulfide) in the amount of 22.5 g was added to 900 ml of ion exchange water which had been adjusted to pH 2 by adding sulfuric acid and dissolved therein by heating, whereupon the pH increased to about 4. 9.0 g of coconut shell active carbon (30 to 60 mesh, produced by Daiichi Tanso Kogyo Co.) was added thereto, stirred at 60° C. for 15 minutes, cooled, filtered and washed in the same manner as in Example 1 to obtain adsorbents.

COMPARATIVE EXAMPLE 2

Coconut shell active carbon (30 to 60 mesh, produced by Daiichi Tanso Kogyo Co.) in the amount of 4.5 g was dipped in a solution consisting of 6.3 g of 80% hydrazine hydrate, 9.7 g of potassium thiocyanate, and 200 ml of water, and 2.8 ml of concentrated sulfuric acid diluted with 50 ml of water was gradually added thereto. Thereafter, the resultant solution was boiled for a short time. After cooling, the supernatant solution was removed by decantation, and the remaining solution was kept at 130° C. for 2 hours in an air bath. It was then washed in the same manner as in Example 1 to obtain adsorbents.

EXAMPLE 2

By using the adsorbents obtained in Example 1 and Comparative Examples 1 and 2, the processing of a $Cu^{2+}$ ion-containing solution was conducted. The processing conditions are as follows:

| | |
|---|---|
| Concentration of $Cu^{2+}$ Ions | 50 ppm ($CuCl_2$) |
| Adsorbent | 250 mg/25 ml |
| pH | 4 |
| Temperature | 25° C. |
| Time | 5 hours |

-continued

| Processing Method | Sealed, Shaked, Batch Method |
|---|---|
| Measurement of Ion Concentration | Low Temperature Gasification Reduction Type Atomic Absorption Method |

TABLE 1

| | Concentration of Remaining $Cu^{2+}$ Ion (ppm) | | |
|---|---|---|---|
| Number of Washing | Example 1 | Comparative Example 1 | Comparative Example 2 |
| 5 | 0.1 | 0.2 | 0.4 |
| 6 | 0.1 | 0.2 | 0.5 |
| 7 | 0.1 | 0.4 | 0.9 |
| 8 | 0.2 | 0.6 | 1.2 |
| 10 | 0.2 | 0.9 | 1.4 |

In Table 1, the concentrations of remaining $CU^{2+}$ ions are compared. From the results illustrated in Table 1, it can be seen that the adsorbent of this invention not only has excellent adsorptivity, but also holds its adsorptivity after being washed with a large amount of water. In these respects, there are significant differences between the adsorbent of this invention and those of the comparative examples in which the reaction product of hydrazine and carbon disulfide is merely adsorbed on active carbon.

EXAMPLE 3 AND COMPARATIVE EXAMPLE 3

Polyethyleneimine (Epomine SP-018 produced by Nippon Shokubai Kagaku Co., molecular weight about 1,800, ratio of primary amine to secondary amine to tertiary amine of 1:1:1) in the amount of 5.5 g was dissolved in 300 ml of ion exchange water, and 15.0 g of coconut shell active carbon (20 to 40 mesh, produced by Daiichi Tanso Kogyo Co.) was added thereto. The resultant mixture was gently stirred over a period of 30 minutes, and after the foaming stopped, the temperature of the mixture was raised to 90° C. over a period of 1 hour. After 2 hours, the heating was stopped and the mixture was cooled with flowing water. After 3 hours, the active carbon was charged to a glass tube with an inner diameter of 15 mm$\phi$ and continuously washed with ion exchange water. The flow rate was 20 ml/min, the amount of water passed was 140 ml, and the ph was 6. Calculating from the increase in weight after drying, the polyethyleneimine adsorption ratio was 8.3 wt.% (based upon the weight of active carbon).

A mixture of 9.0 g of the above obtained polyethyleneimine-adsorbed active carbon (0.0106 equivalent of primary or secondary amino group), 0.304 g (0.004 equivalent) of carbon disulfide, and 100 ml of ion exchange water was gently stirred at ordinary temperature. In the beginning, the mixture was heterogeneous as in Example 1, but in about 5 minutes carbon disulfide was adsorbed on active carbon and active carbon particles were uniformly dispersed. Subsequently the mixture was further stirred for 30 minutes at 50° C. and for 2 hours at 95° C. and, thereafter, it was washed with water in the same manner as in Example 1 to provide adsorbents.

For the thus obtained adsorbent, the mercury adsorption capability was measured by the same method as used in Example 2 except that mercury (II) chloride (1,000 ppm as mercury) was used in place of copper (II) chloride and 0.5 g/100 ml of the adsorbent was used. For comparison, the adsorbent obtained in Comparative Example 1 was measured in the same manner as above. The results are shown in Table 2.

TABLE 2

| Number of Washing | Adsorption Capacity (milliequivalents/g) | |
|---|---|---|
| | Example 3 | Comparative Example 3 |
| 5 | 1.49 | 1.40 |
| 6 | 1.49 | 1.37 |
| 7 | 1.48 | 1.01 |
| 8 | 1.48 | 0.92 |
| 10 | 1.47 | 0.77 |

From the results illustrated in Table 2, it can be seen that the capabilities of the adsorbent of this invention are scarcely reduced by water-washing.

When only polyethyleneimine and carbon disulfide were reacted in the same manner as above, the reaction product precipitated and was insoluble in water, and thus it was impossible to again deposit the reaction product on active carbon.

EXAMPLE 4 AND COMPARATIVE EXAMPLE 4

The adsorbents obtained in Example 1 and Comparative Example 1 were each charged to a glass column with an inner diameter of 18 mm$\phi$ in a height of 200 mm and immersed overnight. Then a mercury-containing solution (200 ppm as mercury, common salt 1 g/l, pH 6) was introduced into the adsorbent column from the top thereof and flowed at SV 10. The amount of the solution passed through the column until the concentration of mercury in the solution passed exceeded 0.5 ppb, and COD (chemical oxygen demand) were measured. The results are shown in Table 3.

TABLE 3

| | Amount of Solution until Mercury Concentration exceeds 0.5 ppb (1/1-R) | Adsorption Capacity (milliequivalents/g) | COD of Solution taken after 20 Minutes* (ppb) |
|---|---|---|---|
| Example 4 | 2,250 | 1.96 | 3 |
| Comparative Example 4 | 1,580 | 1.40 | 9 |

*Measured according to JIS KO 102, 103.

From the results illustrated in Table 3, it can be seen that the adsorbent of this invention has a markedly long duration of life and furthermore the elution of the organic substance is low which is demonstrated by the low COD of the treated solution.

EXAMPLE 5

Active carbon with xylenediamine adsorbed thereon in an adsorption ratio of 6.3% was produced in the same manner as in Example 3, except that 7.6 g of mixed m,p-xylenediamine (m,p mixing ratio: 80:20) was used in place of polyethyleneimine. A mixture of 9.0 g of the active carbon as obtained above, 0.24 g of carbon disulfide (equivalent ratio of amino group to carbon disulfide of 1:0.8), and 100 ml of ion exchange water was processed in the same manner as in Example 3 to provide an adsorbent.

The thus obtained adsorbent was evaluated in the same manner as in Example 4. The amount of the solution passed through the column until the concentration of mercury exceeded 0.5 ppb was 1,730 1/1-R, the adsorption capacity was 1.55 milliequivalents/g, and the COD after 20 minutes was 3. These data indicate that the adsorbent of this invention is excellent.

EXAMPLE 6

The same coconut shell active carbon as used in Example 1 in the amount of 9.00 g was gently stirred in 200 ml of ion exchange water containing 0.90 g (0.012 mole) of carbon disulfide. On adding 100 ml of ion exchange water with 5.5 g of polyethyleneimine (Epomine SP-012 produced by Nippon Shokubai Kagaku Co., molecular weight about 1,200) dissolved therein after no carbon disulfide liquid particles were observed, coagulated active carbon was uniformly dispersed in about 3 minutes. The mixture was further stirred for 20 minutes at room temperature, for 30 minutes at 45° C., and then for 2 hours at 85° C., and it was then washed ten times with 100 ml of ion exchange water to provide an adsorbent.

For the thus obtained adsorbent, the mercury adsorptivity in concentrated brine was measured. The processing conditions employed are as follows:

| | |
|---|---|
| Concentration of $Hg^{2+}$ Ions | 10.1 ppm |
| NaCl | 30.0% |
| Adsorbent | 250 mg/25 ml |
| pH | 7.2 |
| Temperature | 80° C. |
| Time | 5 hours |
| Processing Method | Sealed, Shaked, Batch Method |
| Measurement of Ion Concentration | Low Temperature Gasification Reduction Type Atomic Light Absorption Method |

For comparison, the adsorbents obtained in Comparative Examples 1 and 2 were measured in the same manner as above. The results are shown in Table 4.

TABLE 4

| | Concentration of Remaining $Hg^{2+}$ Ions (ppb) |
|---|---|
| Example 1 | 0.3 |
| Comparative Example 1 | 940 |
| Comparative Example 2 | 1,620 |

Table 4 illustrates the concentration of remaining $Hg^{2+}$ ions. It can be seen that the adsorbent of this invention exhibits high adsorptivity even under severe conditions.

EXAMPLE 7

An adsorbent was produced in the same manner as in Example 6 except that Epomine SP-018 as used in Example 3 was employed. For the thus obtained adsorbent, the mercury adsorptivity in concentrated sulfuric acid was measured. The processing conditions are as follows:

| | |
|---|---|
| Concentration of $Hg^{2+}$ Ions | 0.5 ppm |
| $H_2SO_4$ | 98% |
| Adsorbent | 250 mg/25 ml |
| Temperature | 25%° C. |
| Time | 24 hours |
| Processing Method | Sealed, Shaked, Batch Method |
| Measurement of Ion Concentration | Low Temperature Gasification Reduction Type Atomic Light Absorption Method |

For comparison, the adsorbents obtained in Comparative Examples 1 and 2 were measured in the same manner as above. The results are shown in Table 5, in which the concentrations of remaining $Hg^{2+}$ ions are compared.

TABLE 5

| | Concentration of Remaining $Hg^{2+}$ Ions (ppm) |
|---|---|
| Example 7 | 0.07 |
| Comparative Example 1 | 0.41 |
| Comparative Example 2 | 0.38 |

EXAMPLE 8

An adsorbent was produced in the same manner as in Example 6, except that coal active carbon (20 to 40 mesh, Diahope produced by Mitsubishi Chemical Industry Co.) and triethylenetetramine were used. The thus obtained adsorbent was filled in a glass tube having a cross-sectional area of 1.2 $cm^2$, and an aqueous solution of thimerosal (2.5 ppm as mercury) was passed therethrough at SV 20. The total mercury concentration of the solution passed was measured by the hydroxylamine reduction method.

For comparison, the adsorbents obtained in Comparative Examples 1 and 2, and active carbon alone were measured in the same manner as above, The results are shown in Table 6.

TABLE 6

| Amount of Solution Passed | Concentration of Remaining Mercury (ppb) | | | |
|---|---|---|---|---|
| | Example 8 | Comparative Example 1 | Comparative Example 2 | Active Carbon |
| 150 | 0.8 | 2.2 | 1.7 | 2.1 |
| 300 | 1.5 | 2.6 | 2.4 | 0.5 |
| 350 | 2.2 | 29.9 | 24.0 | 31.1 |
| 400 | 2.6 | 420 | 528 | 677 |
| 450 | 4.8 | 1550 | 1700 | 1850 |
| 500 | 8.7 | 1710 | 1960 | 2430 |

From the results illustrated in Table 6, it can be seen that the adsorbents of this invention has an excellent adsorptivity.

EXAMPLE 9 AND COMPARATIVE EXAMPLE 5

By using the adsorbents obtained in Example 6, the silver adsorptivity in the waste water of a silver-plating was measured. The processing conditions employed are as follows:

| | |
|---|---|
| Concentration of $Ag^+$ Ions | 0.56 ppm |
| Concentration of Ca Ions | 19 ppm |
| Concentration of Na Ions | 17 ppm |
| Adsorbent | 0.5 g/1 l |
| pH | 8.4 |
| Temperature | 50° C. |
| Time | 4 hours |
| Processing Method | Sealed, Shaked Batch Method |
| Measurement of Ion Concentration | Atomic Light Absorption Method |

For comparison, the chelate resin on the market (Dowex A-1 produced by Dow Chemical Co.) was measured in the same manner as above (Comparative Example 5). The results are shown in Table 7.

TABLE 7

| | Adsorption Capacity (mmol/g) |
|---|---|
| Example 9 | 3.5 |
| Comparative Example 5 | 0.2 |

From the results illustrated in Table 7, it can be seen that the adsorbents of this invention has an excellent adsorptivity.

While the invention has been described in detail and with reference to specific embodiments thereof, it will be apparent to one skilled in the art that various changes and modifications can be made therein without departing from the spirit and scope thereof.

What is claimed is:

1. A heavy metal adsorbent of high selectivity which is prepared by treating active carbon with at least one water-soluble primary or secondary amine and carbon disulfide in the presence of water.

2. An adsorbent as in claim 1, wherein 0.2 to 0.5 equivalent of carbon disulfide is used per equivalent of primary or secondary amino group of the water-soluble amine.

3. A heavy metal adsorbent as in claim 1, wherein the grain size of the active carbon is from about 10 to 100 mesh.

4. A heavy metal absorbent as in claim 1, wherein the grain size of the active carbon is from 20 to 60 mesh.

5. A heavy adsorbent as in claim 1, wherein the active carbon is derived from coconut shell carbon activated at low temperature.

6. A process for producing a heavy metal adsorbent of high selectivity which comprises treating active carbon with at least one water-soluble primary or secondary amine and carbon disulfide in the presence of water.

7. A process as in claim 6, wherein 0.2 to 0.5 equivalent of carbon disulfide is used per equivalent of primary or secondary amino group of the water-soluble amine.

8. A process as in claim 6, wherein the water-soluble amine and disulfide are initially allowed to permeate the active carbon in the presence of water at a temperature of 40° C. or less for a period of from 10 minutes to 5 hours.

9. A process as in claim 8, wherein the temperature during the permeation period is from 10° C. to 40° C.

10. A process as in claim 8, wherein the period for permeation is from 30 minutes to 2 hours.

11. A process as in claim 6, 7, 8, 9, or 10, wherein the amine is first adsorbed on the active carbon, and after removing unadsorbed amine, the active carbon containing adsorbed amine is reacted with carbon disulfide.

12. A process as in claim 6, 7, 8, 9, or 10, wherein the treatment of the active carbon is conducted at from about 40° C. to 100° C.

13. A process as in claim 12, wherein the temperature is from 40° C. to 95° C.

14. A process as in claim 13, wherein the temperature is from 65° C. to 90° C.

15. A process as in claim 6, wherein the grain size of the active carbon is from about 10 to 100 mesh.

16. A process as in claim 6, wherein the grain size of the active carbon is from 20 to 60 mesh.

17. An adsorption process of a heavy metal-containing solution which comprises bringing a heavy metal adsorbent of high selectivity prepared by treating active carbon with at least one water-soluble primary or secondary amine and carbon disulfide in the presence of water into contact with a heavy metal-containing solution.

18. An adsorption process as in claim 17, wherein the heavy metal is mercury.

19. An adsorption process as in claim 17, wherein the heavy metal is silver.

20. An adsorption process as in claim 18, wherein the mercury is contained in concentrated sulfuric acid.

21. An adsorption process as in claim 18, wherein the mercury is in the form of an organic mercury compound.

22. An adsorbent process as in claim 17, 18, 19, 20, or 21, wherein the contact time is from about 4 hours to 8 hours.

23. An adsorbent process as in claim 22, wherein the temperature during contact is maintained at from about 45° C. to 100° C.

* * * * *